INVENTOR.
JURI PAWLOWSKI

United States Patent Office 3,502,137
Patented Mar. 24, 1970

3,502,137
METHOD OF INTENSIFYING HEAT TRANSFER IN WORMS HAVING A SINGLE SPINDLE
Juri Pawlowski, Leverkusen, Germany, assignor to Farbenfabriken Bayer Aktiengesellschaft, Leverkusen, Germany, a corporation of Germany
Filed June 7, 1966, Ser. No. 555,855
Claims priority, application Germany, June 22, 1965, F 46,402
Int. Cl. F28f 5/06, 13/00
U.S. Cl. 165—1                4 Claims

ABSTRACT OF THE DISCLOSURE

Process and apparatus for increasing the heat transfer in a worm-type heat exchanger by passing the substance being subjected to heat transfer through the worm-type heat exchanger at a rate greater than that attributable solely to the worm.

---

Figure 1:
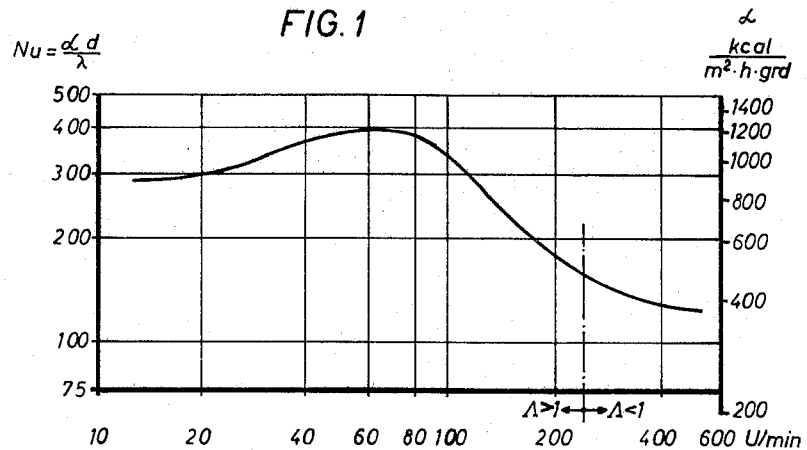

The heat exchange in worm-type apparatus between the material being processed and the apparatus itself plays a relatively important part in many technical processes; for example, the discharge efficiency of the melting worms and extruders is generally limited by the heat energy which can still be transferred to the material being processed without any damage to the latter. The mixing capacity of homogenising worms running at high speed and used for highly viscous or plastic substances is substantially restricted by the possibility of heat of friction being set up in the mixing material which is being extracted from the apparatus.

For constructional and thermal efficiency reasons, the heat exchange between the material being processed and the worm is generally effected through the worm cylinder. When using worm-type apparatus for actively conveying the substance to be treated, quite favourable values for the heat transfer factor $\alpha$ can be reached on the worm cylinder.

For example, when viscous liqugids are conveyed, these values may amount to 250–450 kcal./(m.² hour, degree). These correspond to values for the non-dimensional Nusselt number $Nu$ of about 70–120 (definition of the Nusselt number: $Nu = \alpha d/\lambda$, $d$ being the worm diameter and $\lambda$ the thermal conductivity factor of the fluid).

Since the heat exchange in worms depends almost exclusively on the transport mechanism of the flowing material which is being processed, the heat transfer factor $\alpha$, at least in the case of Newtonian fluids, is practically independent, in a large viscosity range, of the viscosity of the fluid which is being conveyed.

Although the heat engineering properties (explained above) of worm-type apparatus lead directly to their use as heat exchangers, particularly for viscous and plastic substances of high consistency, a broader industrial use of such apparatus as heat exchangers is dicouraged by the fact that the expenditure for indutrial machines, measured according to the thermal yield (in practice) of such heat exchangers, is frequqently too high.

The method explained in the present patent specification for intensifying the heat transfer at the worm cylinder allows the practical thermal efficiency of worm-type heat exchangers to be raised, and, at the same time, allows certain practical working standards for such apparatus to be lowered, so that a more favourable basis is provided for judging the commercial profitability of these apparatus.

By general analogy it was formerly considered that an improvement in the heat transfer factor $\alpha$ in a worm-type apparatus of given construction can only be achieved by increasing the speed of revolution $n$ of the worm. In view of the rapid increase in the driving power which this expedient necessitated, it was only partly desirable, since, in addition to increasing the cost of the working equipment, it would also result, when the processed material was cooled, in an inevitable thermal loading of the heat exchange due to the heat of friction.

The invention is based on the discovery that, in worms having a single spindle, an increase in the number of revolutions of the worm is connected with a decrease in the heat transfer factor $\alpha$ at the worm cylinder. This condition, which is of the utmost importance for the conclusions reached regarding processing, is illustrated in FIGURE 1. This figure shows the dependence of the heat transfer factor $\alpha$ and also of the corresponding Nusselt number $Nu$ on the worm revolutions $n$ in a single spindle, experimental worm with a fluid throughput $q$ kept constant at 1.5 l./min. The measurements were carried out with silicone oils in the viscosity range of 0.5–90 stokes. The conditions were suitably observed with different throughputs and also in connection with worm spindles having different geometrical data.

As known, a prescribed throughput $q$ of a worm can only be achieved if its speed $n$ does not fall below a certain value which is determined by the prevailing $q$ value ($n > n_{min} = q/E$), where E is a constant of the apparatus depending only on the geometry of the worm profile. With the worm spindle shown in FIGURE 1, $E = 6.3 \cdot 10^{-3}$ l./revolution, so that, in conjunction with $q = 1.5$ l./min., the value for the limiting speed $n_{min} > 240$ r.p.m. This value divides the speed axis of FIGURE 1 into two sections: $n > n_{min}$ gives the usual working range in which the worm delivers the prescribed throughput $q$ actively from its own conveying power against a certain pressure in the discharge pipe. When $n < n_{min}$, the worm is unable to supply the established throughput and either an additional conveyor member (pump) or a correspondingly high pressure in the supply pipe is required, in order to produce the prescribed throughput.

It has now been found that an increase in the thermal transfer factor at the housing of the worm is produced if the worms according to the invention are not operated in the usual working range in which the worms themselves convey, but in the range of an extraneous conveying action produced in the same conveying direction. The extraneous conveying action is produced by means of an additional conveyor member or a correspondingly high pressure in the supply pipe.

The characteristic curve of FIGURE 1 shows that the heat transfer factor $\alpha$ only shows a pronounced maximum outside the usual speed range, namely, in the range of the extraneous conveying action. The maximum heat transfer factor can reach a value up to about 1200–1400 kcal./(m.² hour degrees) and is almost independent of the viscosity of the fluid, at least in the considered range of about 1–100 stokes.

Figure 2:
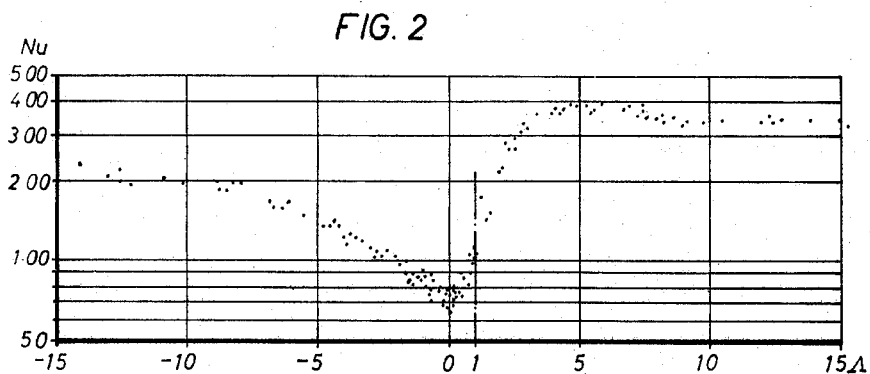

It has now been found that the intensity of the heat transfer can be substantially described by a dependency between the Nusselt number $Nu$ and the kinematic parameter $\Lambda = q/(E.n)$ which plays a main part in the hydrodynamic theory of the worms. Such a function $Nu = f(\Lambda)$, which is influenced to some degree by the worm geometry, is reproduced in FIGURE 2 and represents a generalisation of the circumstances expressed in connection with FIGURE 1. With worms of differing geometry, the habitus of the curve which is developed remains in its essential positions. The usual working range of the worms when they are themselves conveying corresponds in FIGURE 2 to the narrow interval $0 < \Lambda < 1$. The maximum of the Nusselt number and thus also the heat transfer factor $\alpha$ is approximately at $\Lambda = 5$, thus being substantially independent of the worm geometry and the viscosity of the fluid, and is thus far from the usual working range of the worms.

This position of the maximum of the heat transfer factor is combined with a decisive technical processing advantage. Corresponding to the value $\Lambda_{max}=5$, the worm speed amounts at this position to only 20% of the already explained critical speed $n_{min}=q/E$; since the driving power which is transformed in the fluid almost completely to heat of friction, is approximately proportional to the power of 1.4 to 2 of the speed, depending on the rheological properties of the fluid, it falls at $\Lambda=5$ to about 5%–10% of the value otherwise to be expected in the range of self-conveying. This circumstance is of decisive importance from the viewpoint of both an industrial machine and industrial thermal efficiency, because, in this way a heavy loading of the worm-type heat exchanger with the heat of friction is avoided when the fluid is cooled.

The best possible working point of a worm-type heat exchanger is not necessarily identical with the point of the maximum heat transfer factor: for example, if the object of the heat exchanger is to cool a highly viscous liquid, it is more favourable to displace the working point of the apparatus from $\Lambda_{max}=5$ by a certain amount towards the right to the larger $\Lambda$ values. In this way, with a prescribed throughput, the worm speed is additionally reduced by a corresponding amount and the loading of the heat exchanger with the heat of friction is further lowered, even if at the expense of a slightly less satisfactory heat transfer factor. The actual position of the optimum depends on the corresponding data, especially on the viscosity of the fluid, and can be established by calculation, by experiment or, automatically, by means of suitable regulating devices.

Moreover, the range of the negative $\Lambda$ values can be utilised for meeting technical heat problems, even with a lower degree of efficiency. This applies especially to those cases in which a better homogenisation of the substance is also needed at the same time.

Figure 3:
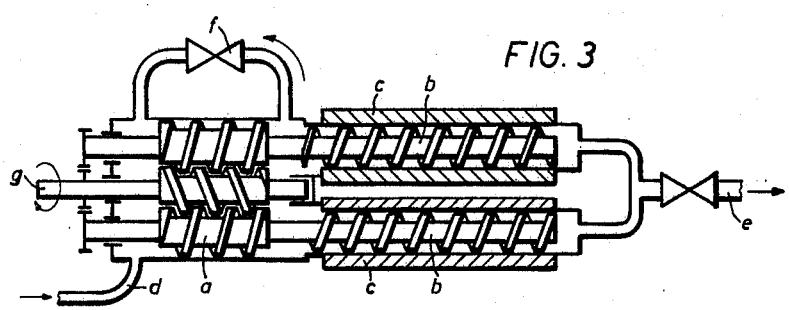

FIGURE 3 shows diagrammatically one constructional example of a worm-type heat exchanger according to the invention. The heat exchanger consists of a volumetrically conveying screw pump $a$ followed by two single-spindle worms $b$, which are driven in common with the pump component. Each of the two worm spindles is enclosed by a cylindrical housing, through which the heat exchange takes place between the substance to be treated and the cooling or heating medium $c$. The material to be treated enters the heat exchanger at $d$, flows through the apparatus and discharges again through a throttle valve at $e$. The screw pump is provided with an adjustable check valve $f$, through which, optionally, some of the substance can flow back.

The geometrical dimensions of the screw pump $a$ and the two worm spindles $b$ are designed so that the ratio of their conveyor capacities is greater than the above value of the kinematic parameter $\Lambda_{max}=5$. This conveying ratio is independent of the speed of the heat exchanger, due to the conveyor characteristic of the screw pump being proportional to the speed. The check valve $f$ allows the regulation of the worm-type heat exchanger to optimum conditions, as already explained, by producing with constant throughput, a simultaneous alteration of the speed and of the return flow ratio and thus of the corresponding value of the kinematic parameter $\Lambda$.

I claim:

1. Heat transfer apparatus comprising worm-type heat exchange means; feed means for introduction of a substance to be subjected to heat exchange; exit means for said substance; and additional conveying means between said feed means and said heat exchange means adapted to impart to said substance through-put rates greater than that attributable solely so said work-type heat exchange means.

2. Apparatus claimed in claim 1 wherein said additional conveying means is a source of high pressure.

3. Apparatus claimed in claim 1 wherein said additional conveying means is a screw pump.

4. In a heat transfer method comprising passing a substance to be heated into and through a worm-type heat exchanger; the improvement which comprises imparting to said substance, upstream of said worm-type heat exchanger, a flow rate sufficient to pass said substance through said worm-type heat exchanger at a rate exceeding that flow rate attributed only to said worm-type heat exchanger.

References Cited

UNITED STATES PATENTS 3,215,192  11/1965  Sollich _____ 165—63

ROBERT A. O'LEARY, Primary Examiner

C. SUKALO, Assistant Examiner

U.S. Cl. X.R.

165—87